UNITED STATES PATENT OFFICE.

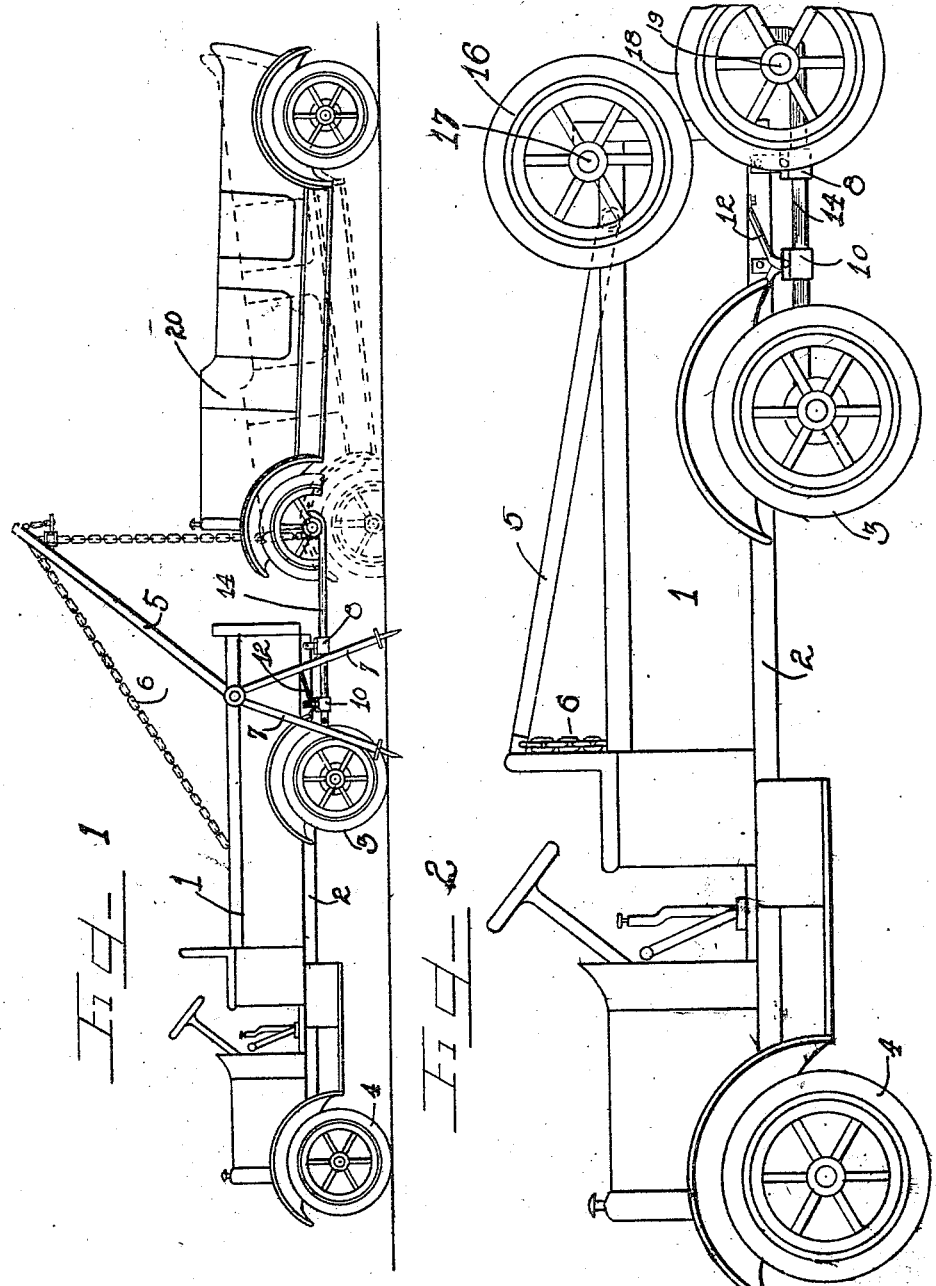

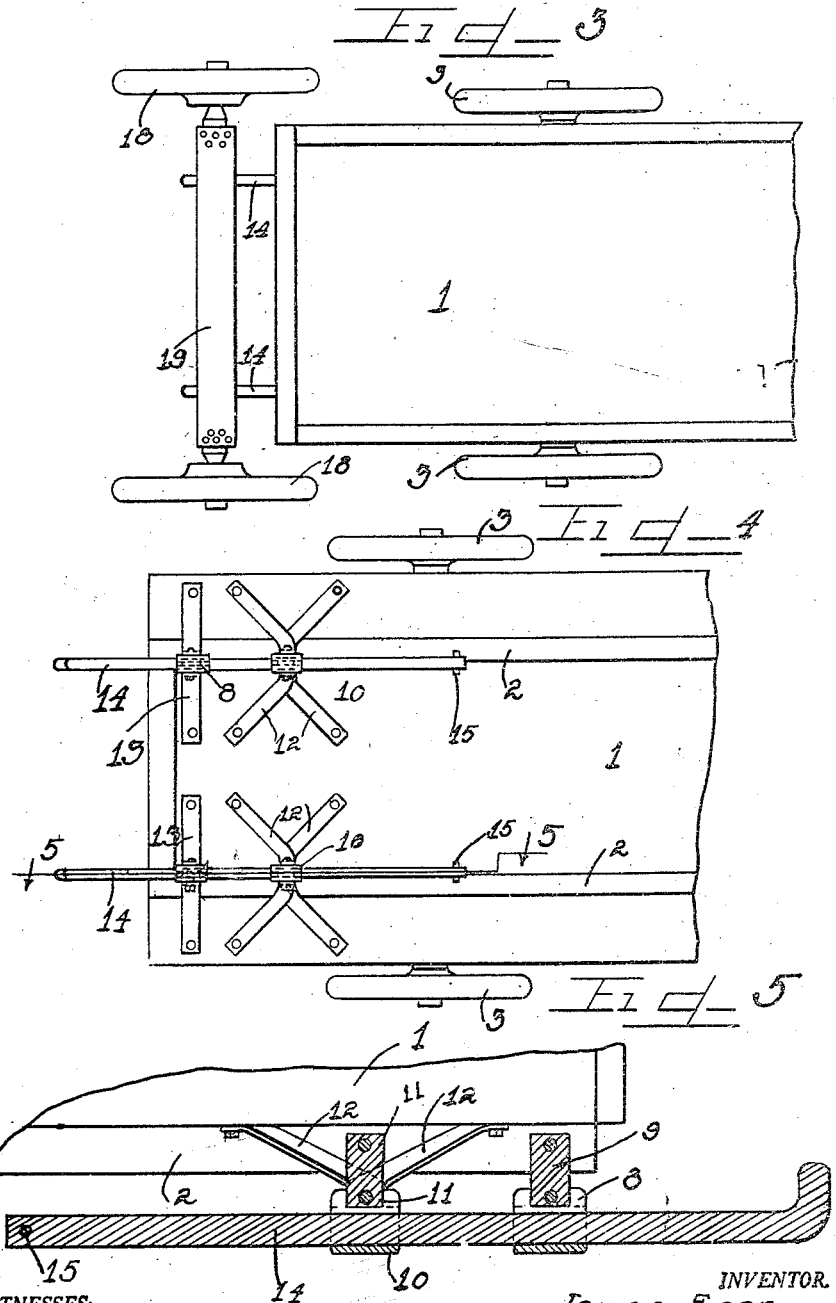

JAMES EGAN, OF CHICAGO, ILLINOIS.

WRECKING-TRUCK.

1,266,238. Specification of Letters Patent. Patented May 14, 1918.

Application filed April 18, 1917. Serial No. 162,971.

*To all whom it may concern:*

Be it known that I, JAMES EGAN, a citizen of the United States, and a resident of the city of Chicago, in the county of Cook and State of Illinois, have invented certain new and useful Improvements in Wrecking-Trucks; and I do hereby declare that the following is a full, clear, and exact description of the same, reference being had to the accompanying drawings, and to the numerals of reference marked thereon, which form a part of this specification.

This invention relates to an improved type of wrecking truck similar in construction to that shown in my Patent No. 1,116,579, issued November 16th, 1914, and contemplates an auxiliary temporary supporting means mounted on the truck adapted to receive one end of a disabled vehicle supported thereon. For instance, when the axle or wheels of a vehicle running gear are damaged, the vehicle may be quickly removed to one side of the road or other right of way for further operations thereon before towing the same to a place of repair. When accidents occur on a street car or other right of way, or upon a crowded thoroughfare, it is necessary to provide a means for quickly removing the vehicle to a temporary working point so that the necessary adjustments upon the vehicle and towing mechanism may be made before towing the vehicle to a place of repair.

It is an object therefore of this invention to provide a wrecking truck equipped with a temporary supporting and towing mechanism for a disabled vehicle whereby the end of the vehicle which is damaged may be elevated for support thereon and towed thereby.

It is also an object of this invention to provide a wrecking truck equipped with adjustable mechanism to receive a damaged vehicle supported thereon whereby the vehicle may be quickly moved from the point of accident.

It is furthermore an important object of this invention to construct a wrecking truck equipped with slidable frame members adapted to be drawn outwardly beyond the end of the truck into supporting position to receive either end of a disabled car, elevated by a crane mounted in the truck, onto said members to support the damaged end of the car out of contact with the ground and to tow the vehicle thereby with the other end of the vehicle supported upon the undamaged portion of its running gear.

Other and further important objects of the invention will be evident from the disclosure in the drawings and specification.

The invention (in a preferred form) is illustrated in the drawings and hereinafter more fully described.

On the drawings:

Figure 1 is a diagrammatic side elevation illustrating a wrecking truck embodying the principles of my invention shown handling a vehicle, the front portion of the running gear of which is damaged.

Fig. 2 is an enlarged side elevation of the wrecking truck, showing the disposal of the auxiliary supporting mechanism and trailer running gear sections.

Fig. 3 is a fragmentary diagrammatic top plan view of the rear portion of the truck showing one of the trailer running gear sections carried upon the auxiliary adjustable supporting members of the truck.

Fig. 4 is a bottom plan view of the rear end of the truck.

Fig. 5 is a sectional detail on line 5—5 of Fig. 4.

As shown on the drawings:

The reference numeral 1, indicates the body of a wrecking truck which is supported upon frame sills 2, of the truck, and journaled at the rear of the frame of the truck are driving wheels 3, and at the forward end thereof are steering wheels 4. Mounted upon the body of the truck is a crane 5, provided with an elevating chain 6, and suitable operating mechanisms are provided therefor, but not shown nor described, since this mechanism forms no part of the present invention. As shown in Fig. 1, when the crane 5, is in operating position, bracing legs 7, are attached upon the pivot shaft of the crane 5, and bear upon the ground to assist in supporting the crane mechanism and to afford a rigid base therefor.

Attached beneath the body of the wrecking truck upon the frame sills 2, are bearing guides 8, secured to the sills 2, by brackets 9, and alined with each of said guides 8, are similar guides 10, attached to said respective sills by brackets 11. The inner bearing guides 10, are braced by rigid metal straps 12, secured thereto and arranged diagonally beneath the body 1, and the outer guides 8, are rigidly braced by transversely extending straps 13. Slidably engaged through said respective pairs of bearing guides 8 and 10, are bars or rods 14, the outer ends of which are turned upwardly, as clearly shown in Fig. 5, and secured to the inner ends of each thereof are pins 15, which operate to prevent withdrawal of said supporting rods or bars from within the bearing guides therefor.

Of course, while I have shown a particular method for mounting the slidable rods or bars 14, upon the truck, it is obvious that any means for the purpose may be used, permitting extension of said bars into a position to support a vehicle upon the outer ends thereof. As shown in Fig. 2, when the crane 5, is swung downwardly into position out of use, one of the trailer running gear sections, consisting of a pair of wheels 16, on an axle 17, is carried upon the upper rear portion of the body 1, and the other trailer running gear section, comprising a pair of wheels 18, journaled upon an axle 19, is carried upon the ends of the partially extended slide bars 14.

The operation is as follows:

The wrecking truck, when proceeding to a disabled vehicle, carries the auxiliary running gear trailer sections in the position shown in Fig. 2, and when the disabled vehicle is reached, the auxiliary running gear sections are removed preparatory to possible use of either one or both thereof. The anchor legs 7, are swung down and engaged in the ground as shown in Fig. 1, and the crane 5, and chain 6, are then used to elevate the disabled vehicle, denoted as a whole by the reference numeral 20, from the dotted line position shown in Fig. 1, to the full line position. That is, the front end of the disabled vehicle is elevated by the chain 6, onto the supporting rods or bars 14, which have first been withdrawn rearwardly, as shown in Fig. 1. The legs 7, are then disconnected and with or without the chain 6, still connected to the vehicle, the wrecking truck is used to tow the vehicle to one side of the thoroughfare or right of way. After the vehicle has been thus handled temporarily, the running gear wheels 16 and 19, respectively, or either one of them, depending upon the nature of the accident to the vehicle, are used to support the disabled end of the vehicle in the manner disclosed in my aforesaid Patent No. 1,116,579, and the vehicle then towed to a place of repair. Although this invention merely comprehends the immediate and necessary quick removal of the vehicle from the right of way to a point at which the auxiliary running gear wheels 16 and 19, may be attached in position, it is, of course, obvious that the vehicle so disposed relative to the wrecking truck may be moved the entire necessary distance to the point of repair.

While I have shown the front end of the vehicle 20, as disabled and being supported upon the bars 14, it is clear that the rear end of the vehicle could be likewise elevated thereon in the event the front running gear were undamaged.

I am aware that various details of construction may be varied through a wide range without departing from the principles of this invention, and I therefore do not purpose limiting the patent granted otherwise than necessitated by the prior art.

I claim as my invention:

1. The combination with a wrecking truck, of slidable extensible supporting means mounted therebeneath, and mechanism mounted on the truck for elevating a vehicle upwardly for support upon said extended means.

2. The combination with a wrecking truck and elevating mechanism thereon, of means slidably associated with said truck adapted to be extended rearwardly thereof to receive a vehicle supported thereon, said mechanism operating to elevate the vehicle thereto.

3. The combination with a wrecking truck and elevating mechanism mounted thereon to elevate one end of a vehicle, of means slidably associated with said truck adapted to be extended rearwardly therefrom to receive the ends of the vehicle elevated by said mechanism disposed thereon.

4. The combination with a vehicle and elevating mechanism mounted on the vehicle, of guides secured beneath the vehicle, and means slidable through said guides for extension beyond the vehicle to receive another vehicle supported thereon elevated into position by said mechanism.

5. The combination with a wrecking truck having an elevating means mounted thereon, of slidable supporting and towing means extensible from the truck into position to receive another vehicle supported thereon in towing position.

6. The combination with a wrecking truck, of a mechanism carried thereby for hoisting and supporting one end of a vehicle, means carried by the truck adapted to engage and space a vehicle from the rear of the wrecking truck and a pair of rear supporting wheels carried by said truck adapted to support the rear of the wrecked vehicle thereon.

7. In a mechanism of the class described, the combination with a wrecking car, of a mechanism adapted to engage one end of a vehicle and support it raised off of the ground adjacent the rear of the wrecking car and a mechanism carried by the wrecking car adapted to be moved to engage the end of the vehicle adjacent the car to space the same from the end of the wrecking car.

8. In a mechanism of the class described, the combination with a wrecking car, of a hoisting mechanism adapted to engage one end of a vehicle and support it raised off of the ground adjacent the rear of the wrecking car, a mechanism carried by the wrecking car adapted to be moved to engage the end of the vehicle adjacent the car to pull the vehicle and space the same from the end of the wrecking car, and a running gear section adapted to support the end of the vehicle farthest from the car.

In testimony whereof I have hereunto subscribed my name in the presence of two subscribing witnesses.

JAMES EGAN.

Witnesses:
   CHARLES W. HILLS, JR.,
   EARL M. HARDINE.